(12) United States Patent
Park et al.

(10) Patent No.: US 10,135,088 B2
(45) Date of Patent: Nov. 20, 2018

(54) PIN-TYPE RECHARGEABLE BATTERY

(71) Applicant: SAMSUNG SDI CO., LTD., Yongin-si, Gyeonggi-do (KR)

(72) Inventors: Sang-In Park, Yongin-si (KR); Eun-Young Goh, Yongin-si (KR); Ji-Woon Lee, Yongin-si (KR); Jin-Hyon Lee, Yongin-si (KR); Sung-Yong Kim, Yongin-si (KR); Jin-Seon Shin, Yongin-si (KR); Jong-Ki Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 178 days.

(21) Appl. No.: 14/835,574

(22) Filed: Aug. 25, 2015

(65) Prior Publication Data

US 2016/0118681 A1  Apr. 28, 2016

(30) Foreign Application Priority Data

Oct. 24, 2014 (KR) .................. 10-2014-0145327

(51) Int. Cl.
| | | |
|---|---|---|
| *H01M 10/04* | (2006.01) | |
| *H01M 2/06* | (2006.01) | |
| *H01M 2/30* | (2006.01) | |
| *H01M 4/02* | (2006.01) | |
| *H01M 2/02* | (2006.01) | |

(52) U.S. Cl.
CPC ......... *H01M 10/0431* (2013.01); *H01M 2/06* (2013.01); *H01M 2/30* (2013.01); *H01M 4/02* (2013.01); *H01M 2/022* (2013.01)

(58) Field of Classification Search
CPC ...... H01M 10/0431; H01M 4/02; H01M 2/30; H01M 2/06; H01M 2/022
USPC ............................................................ 429/94
See application file for complete search history.

(56) References Cited

U.S. PATENT DOCUMENTS

| | | | | |
|---|---|---|---|---|
| 2008/0118822 A1* | 5/2008 | Lee | ......................... | H01M 4/66 429/94 |
| 2011/0117403 A1* | 5/2011 | Hermann | ................. | H01M 2/00 429/94 |
| 2011/0129706 A1* | 6/2011 | Takahashi | ............... | H01M 2/22 429/94 |

FOREIGN PATENT DOCUMENTS

| | | |
|---|---|---|
| KR | 10-2009-0043525 A | 5/2009 |
| KR | 10-2013-0091532 A | 8/2013 |

* cited by examiner

*Primary Examiner* — Gary D Harris
(74) *Attorney, Agent, or Firm* — Lewis Roca Rothgerber Christie LLP

(57) ABSTRACT

A rechargeable battery includes: an electrode assembly including a first electrode, a second electrode, and a separator, the first and second electrodes being located on either side of the separator and wound together; a center pin located within the electrode assembly and electrically connected to an uncoated region of the first electrode; a case accommodating the electrode assembly and electrically connected to an uncoated region of the second electrode; a terminal extending to the outside of the case from the center pin; and a gasket located between the terminal and an opening of the case and sealing the opening.

14 Claims, 5 Drawing Sheets

PIN-TYPE RECHARGEABLE BATTERY

CROSS-REFERENCE TO RELATED APPLICATION

This application claims priority to and the benefit of Korean Patent Application No. 10-2014-0145327 filed in the Korean Intellectual Property Office on Oct. 24, 2014, the entire contents of which are incorporated herein by reference.

BACKGROUND

1. Field

The present invention relates to a rechargeable battery.

2. Description of the Related Art

Rechargeable batteries may be categorized into small cylindrical and rectangular batteries or large rectangular batteries, depending on size and capacity.

The demand for small cylindrical and rectangular rechargeable batteries as an energy source has increased in accord with the technical development of and demand for mobile devices.

In general, a rechargeable battery includes an electrode assembly including electrodes located on either side of a separator and wound into a jelly roll shape, a case accommodating the electrode assembly, and a cap assembly hermetically sealing an opening of the case.

As demand for mobile devices has increased, so has demand for accessories such as a touch pen or stylus pen with a diameter of several mm. However, rechargeable batteries for use in devices with a very small diameter (i.e., a diameter of several mm) have not been developed yet.

The above information disclosed in this Background section is only for enhancement of understanding of the background of the invention and therefore it may contain information that does not form the prior art that is already known in this country to a person of ordinary skill in the art.

SUMMARY

One or more embodiments of the present invention provide a pin-type rechargeable battery having a very small diameter. One or more embodiments of the present invention provide a rechargeable battery that may be produced according to a simplified process and may increase energy density by reducing the number of parts required.

A rechargeable battery according to one or more embodiments of the present invention includes: an electrode assembly formed by winding a first electrode, a second electrode, and a separator, the first and second electrodes being located on either side of the separator; a center pin located inside the electrode assembly and electrically connected to an uncoated region of the first electrode; a case accommodating the electrode assembly and electrically connected to an uncoated region of the second electrode; a terminal extending to the outside of the case from the center pin; and a gasket located between the terminal and an opening of the case and hermetically sealing the opening.

The uncoated region of the first electrode may be along the length of the electrode assembly, and along the length of the center pin.

The uncoated region of the first electrode may be connected to the center pin by welding.

The uncoated region of the second electrode may be along the length of the electrode assembly at the outermost end of the electrode assembly (i.e., at the end radially furthest from the center pin).

The uncoated region of the second electrode may contact the inner surface of the case.

The uncoated region of the second electrode may include an extended portion which extends a distance that is greater than the distance between the bottom of the case and the inner surface of the gasket. The extended portion may be bent and come into contact with the inner surface of the case (i.e., may be bent at the end radially furthest from the center pin or at the outermost end).

The current collector and the extended portion of the second electrode may be made of aluminum, and the case may be made of stainless steel.

The diameter of the terminal may be greater than that of the center pin.

The case may include a beading portion that is recessed toward the center of the diameter near the boundary of the center pin and the terminal.

The uncoated region of the first electrode may be adjacent to the gasket along the length of the electrode assembly.

The uncoated region of the first electrode may include a first extended portion which extends from the center of the diameter of the electrode assembly, and the first extended portion may be welded to the center pin.

The uncoated region of the second electrode may be at the bottom of the case along the length of the electrode assembly.

The uncoated region of the second electrode may include a second extended portion which extends from the outermost end of the diameter of the electrode assembly, and the second extended portion may be bent at the outermost end along the circumference of the electrode assembly.

According to one or more embodiments of the present invention, a pin-type rechargeable battery with a very small diameter can be formed by electrically connecting an uncoated region of a first electrode (e.g., a negative electrode) to a center pin located inside an electrode assembly and connecting an uncoated region of a second electrode (e.g., a positive electrode) to a case at the outer end of the electrode assembly.

Moreover, one or more embodiments of the present invention can reduce the number of parts required since the first and second electrodes do not include electrode tabs and the uncoated regions of the first and second electrodes are directly connected to the center pin and the case, respectively. Accordingly, the manufacturing process of the rechargeable battery is simplified, and energy density is increased.

DETAILED DESCRIPTION

Figure 1:
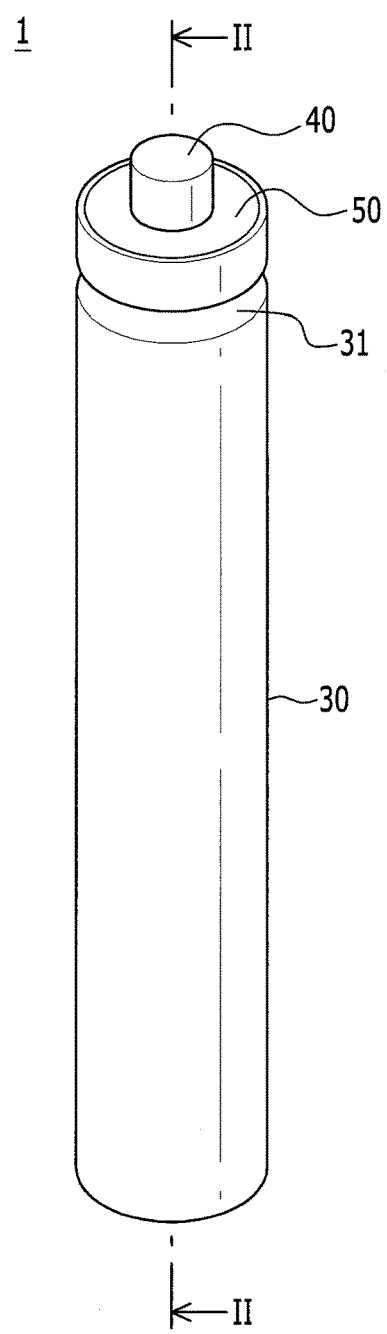
FIG. 1 is a perspective elevation view of a rechargeable battery according to a first exemplary embodiment of the present invention.

The present invention is described more fully hereinafter with reference to the accompanying drawings, in which exemplary embodiments of the invention are shown.

As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

FIG. 1 is a perspective view of a rechargeable battery according to one or more embodiments of the present invention. Referring to FIG. 1, the rechargeable battery of the first exemplary embodiment is a pin-type battery with a diameter of several millimeters, for example of about 2 to 5 mm.

Figure 2:
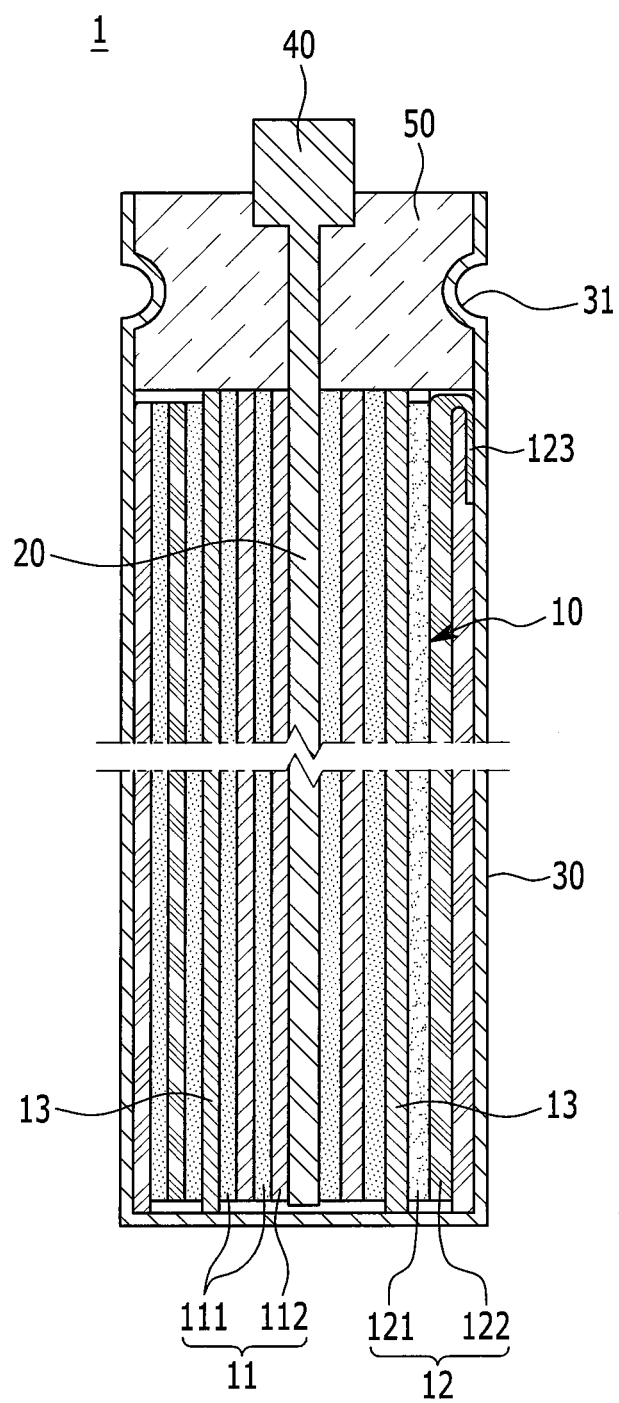
FIG. 2 is a cross-sectional view taken along the line II-II of FIG. 1.

FIG. 2 is a cross-sectional view taken along the line II-II of FIG. 1. Referring to FIG. 2, the rechargeable battery 1 includes an electrode assembly 10 for charging and discharging, a center pin 20 located inside the electrode assembly 10, a case 30 accommodating the electrode assembly 10 and an electrolyte, a terminal 40 connected to the center pin 20, and a gasket 50 interposed between the terminal 40 and an opening of the case 30.

The electrode assembly 10 includes a first electrode 11 (e.g., a negative electrode) and a second electrode 12 (e.g., a positive electrode) which are located on either side of a separator 13 interposed between the two electrodes 11, 12. The electrode assembly 10 is formed by winding the negative electrode 11, the positive electrode 12, and the separator 13 into a jelly roll shape. The separator 13 may be an insulator between the two electrodes 11, 12.

Figure 3:
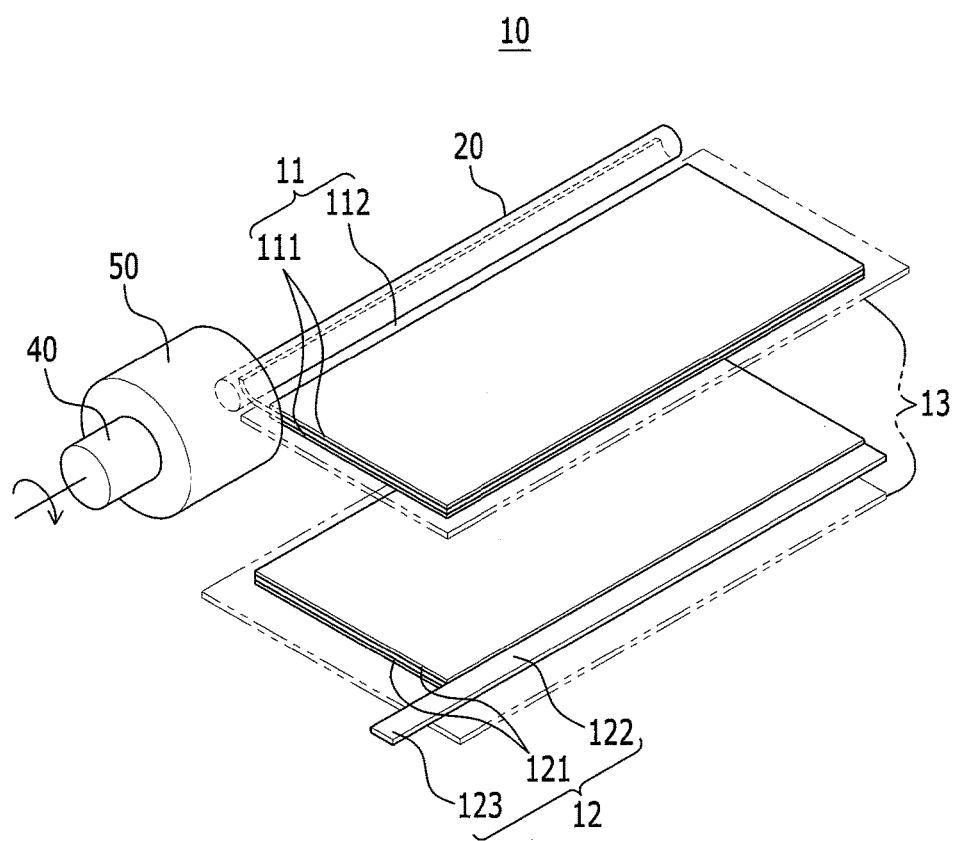
FIG. 3 is an exploded perspective view of an electrode assembly of FIG. 2.

Referring to FIG. 2 and FIG. 3, the negative electrode 11 and the positive electrode 12 include coated regions 111 and 121, respectively, where an active material is applied to both sides of a current collector made of a metal foil (e.g., Cu or Al foil), and uncoated regions 112 and 122, respectively, where no active material is applied, thereby exposing the current collector.

The uncoated region 112 of the negative electrode 11 is formed along the length of the electrode assembly 10, i.e., along the length of the center pin 20. That is, the uncoated region 112 of the negative electrode 11 is provided at the center of the electrode assembly 10 along the length of the electrode assembly 10.

Thus, the negative electrode 11 does not have a negative electrode tab, and the uncoated region 112 is directly connected to the center pin 20. Accordingly, the number of parts of the negative electrode 11 is reduced, and the manufacturing process of the rechargeable battery 1 is simplified.

The uncoated region 122 of the positive electrode 12 is formed along the length of the electrode assembly 10 at the outermost end of the electrode assembly 10. In this way, the positive electrode 12 does not have a positive electrode tab. The number of parts of the positive electrode 12 is thus reduced, and the manufacturing process of the rechargeable battery 1 is simplified.

Thus, more coating layers or coated regions 111 and 121 may fit inside of the case 30 because the negative electrode 11 and the positive electrode 12 do not have negative and positive electrode tabs connected to their uncoated regions 112 and 122. Thus, the rechargeable battery 1 can have a higher energy density.

The center pin 20 is located inside the electrode assembly 10, i.e., in the center of the electrode assembly 10, with the negative electrode 11, the positive electrode 12, and the separator 13 wound around it. That is, the electrode assembly 10 is wound around the center pin 20, and the center pin 20 provides strength to the electrode assembly 10.

The uncoated region 112 of the negative electrode 11 is electrically connected to the center pin 20. For example, the uncoated region 112 of the negative electrode 11 may be connected to the center pin 20 by welding. In one or more embodiments, the uncoated region 112 may be spot-welded to the outer peripheral surface of the center pin 20 along the length of the center pin 20.

The case 30 has an opening on one side to allow for insertion of the electrode assembly 10, and is formed in a cylindrical shape to receive the cylindrical electrode assembly 10. The case 30 allows the rechargeable battery 1 to be formed as a pin-type battery with a very small diameter, and defines the outer diameter of the rechargeable battery 1.

With the electrode assembly 10 inside the case 30, the uncoated region 122 of the negative electrode 12 is electrically connected to the case 30. For example, the uncoated region 122 of the positive electrode 12 may be connected to the inner surface of the case 30 through contact. That is, the uncoated region 122 of the positive electrode 12 is electrically connected to the inner surface of the case 30 by inserting the electrode assembly 10 into the case 30.

The uncoated region 122 of the positive electrode 12 includes an extended portion 123 which extends a distance that is greater than the distance between the bottom of the case 30 and the inner surface of the gasket 50 (i.e., along the length of the rechargeable battery).

The uncoated region 122 and the extended portion 123 are formed integrally with the current collector of the positive electrode 12. The extended portion 123 is bent and contacts the inner surface of the case 30. That is, the extended portion 123 may be positioned at a radial distance furthest from the center pin 20 or at the outermost end. The extended portion 123 allows the positive electrode 12 to come into contact with the inner surface of the case 30 more firmly.

Although not shown, the extended portion may have a spring structure which is bent multiple times along the diameter of the electrode assembly and comes into elastic contact with the inner surface of the case. Thus, the extended portion of the positive electrode may maintain an electrical connection to the case even when a vibration or external impact is applied to the rechargeable battery.

In one or more embodiments, the current collector and extended portion 123 of the second electrode 12 (e.g., the positive electrode) may be made of aluminum, and the case 30 may be made of stainless steel. As the extended portion 123 comes into contact with the inner surface of the case 30, the electrical connection may be maintained effectively even if the extended portion 123 and the case 30 are made of different materials, as compared to welding.

Accordingly, the case 30 is connected to the uncoated region 122 of the second electrode 12 and acts as a positive terminal of the rechargeable battery 1. The terminal 40 extends to the outside of the case 30 from the center pin 20 connected to the uncoated region 112 of the first electrode 11 (e.g., the negative electrode) and acts as a negative terminal.

Although not shown, the case may be connected to the uncoated region of the first electrode and act as a negative terminal of the rechargeable battery, and the terminal may be connected to the outside of the case from the center pin connected to the uncoated region of the second electrode and act as a positive terminal.

The gasket 50 is interposed between the terminal 40 and the opening of the case 30 to electrically insulate the terminal 40 and the case 30 and to hermetically seal the case 30 accommodating the electrode assembly 10 and the electrolyte.

The gasket 50 is fit to the opening of the case 30 and then fixed to the opening of the case 30 by a crimping process. In this instance, a beading portion 31 that is recessed toward the center of the diameter of the case 30 is formed at the opening of the case 30.

In one or more embodiments, the diameter of the terminal 40 may be greater than that of the center pin 20. Since the diameter of the terminal 40 is greater than that of the center pin 20, the gasket 50 and the terminal 40 can be fastened together firmly when the gasket 50 seals the space between the terminal 40 and the opening of the case 30.

The beading portion 31 is recessed toward the center of the diameter near the boundary of the center pin 20 and the terminal 40, i.e., where the diameter of the center pin 20 and the terminal 40 changes. Accordingly, the terminal 40 and the gasket 50 can be fastened together more firmly as the beading portion 31 of the case 30 compresses the gasket 50. In one or more embodiments, the gasket 50 may be made from rubber.

Figure 4:
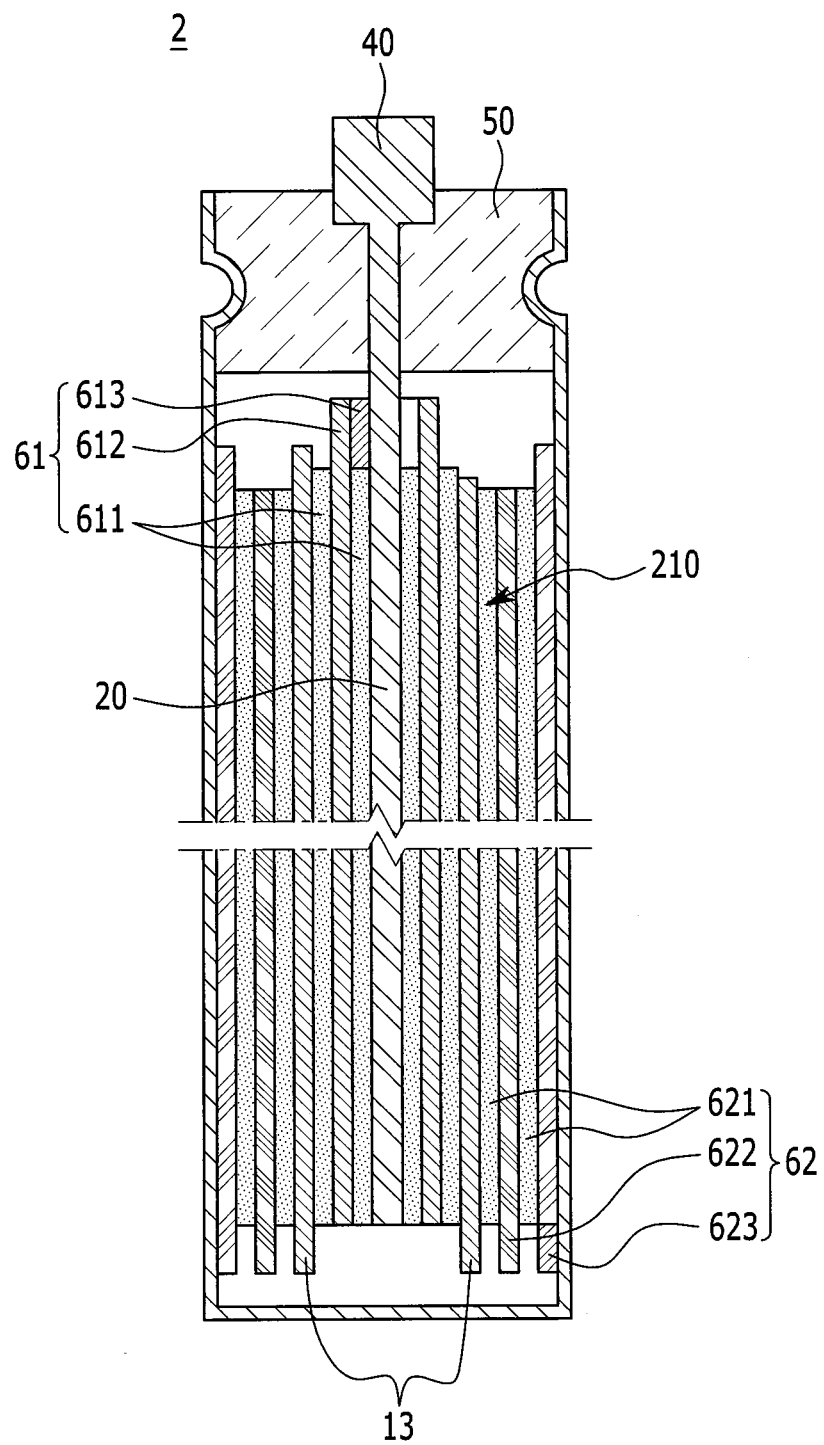
FIG. 4 is a cross-sectional view of a rechargeable battery according to a second exemplary embodiment of the present invention.
Figure 5:
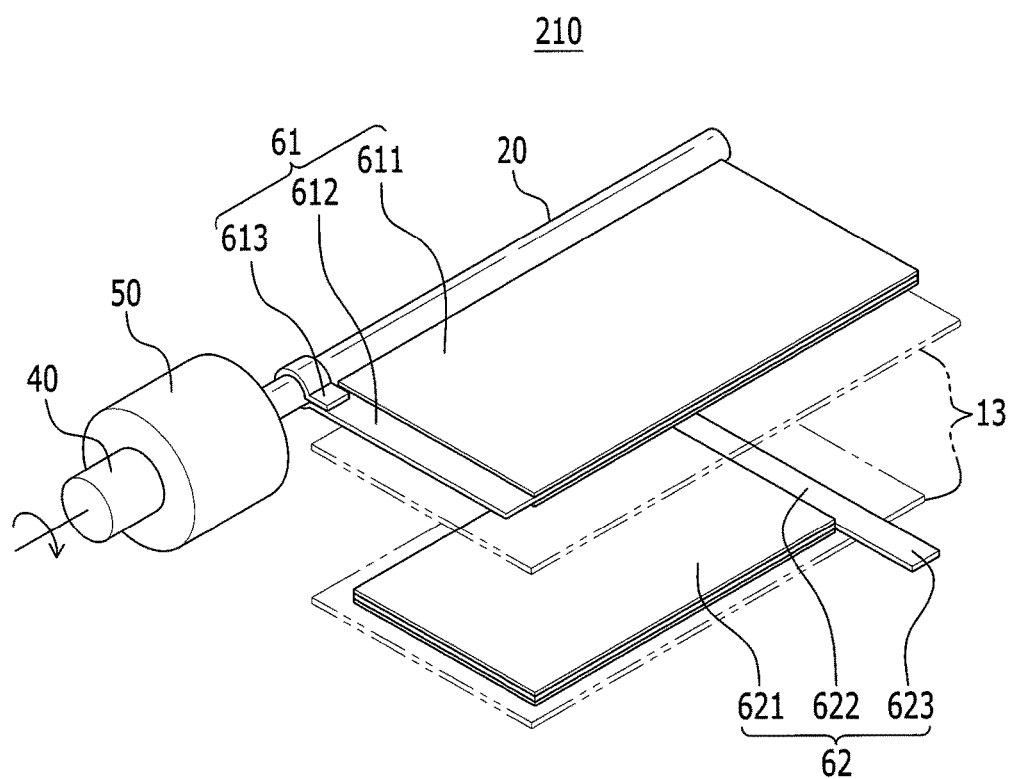
FIG. 5 is an exploded perspective view of an electrode assembly of FIG. 4.

FIG. 4 is a cross-sectional view of a rechargeable battery according to a second exemplary embodiment of the present invention, and FIG. 5 is an exploded perspective view of an electrode assembly of FIG. 4. The following disclosure focuses on the description of components that are not disclosed in the description set forth above, and redundant description of like components may be omitted.

Referring to FIG. 4 and FIG. 5, a rechargeable battery 2 according to one or more embodiments of the present invention includes an uncoated region 612 of a negative electrode 61 that is formed along the length of an electrode assembly 210 and adjacent to a gasket 50. The uncoated region 612 of the negative electrode 61 is wound around a center pin 20.

The uncoated region 612 of the negative electrode 61 includes a first extended portion 613 which extends from the center of the diameter of the electrode assembly 210 radially outward. The first extended portion 613 is welded to the center pin 20. Thus, the negative electrode 61 has no negative electrode tab, and the uncoated region 612 and the first extended portion 613 are directly connected to the center pin 20. Accordingly, the number of parts of the negative electrode 61 is reduced, and the manufacturing process of the rechargeable battery 2 is simplified.

An uncoated region 622 of a positive electrode 62 is formed at the bottom of the case 30 along the length of the electrode assembly 210. The uncoated region 622 of the positive electrode 62 is wound with the electrode assembly 210 at the bottom of the case 30.

The uncoated region 622 of the positive electrode 62 includes a second extended portion 623 which extends radially from the positive electrode 62 at an end of the positive electrode 62 furthest from the center pin 20 (i.e., at the outermost end). The second extended portion 623 is bent along the circumference of the electrode assembly 210. Thus, the positive electrode 62 has no negative electrode tab, and the uncoated region 622 and the second extended portion 623 are directly connected to the inner surface of the case 30. Accordingly, the number of parts of the positive electrode 62 is reduced, and the manufacturing process of the rechargeable battery 2 is simplified.

Thus, more coating layers 611 and 621 may fit inside the case 30 because the negative electrode 61 and the positive electrode 62 have no negative and positive electrode tabs connected to their respective uncoated regions 612 and 622 and the first and second extended portions 613 and 623, respectively. Thus, the rechargeable battery 2 may have higher energy density.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS OF
NON-LIMITING EMBODIMENTS 1, 2: rechargeable battery
10, 210: electrode assembly
11, 61: first electrode or negative electrode
12, 62: second electrode or positive electrode
13: separator
20: center pin
30: case
31: beading portion
40: terminal
50: gasket
111, 121: coated region
112, 122, 612, 622: uncoated region
123, 613, 623: extended portion

What is claimed is:

1. A rechargeable battery comprising:
an electrode assembly comprising a first electrode, a second electrode, and a separator, the first and second electrodes being located on either side of the separator, and wherein the first electrode, the second electrode, and the separator are wound together;
a solid center pin located within the electrode assembly such that the electrode assembly is wound around the center pin, the center pin being directly physically and electrically connected to an uncoated region of the first electrode;
a case accommodating the electrode assembly and electrically connected to an uncoated region of the second electrode;
a terminal extending from the center pin outside of the case; and
a gasket between the terminal and an opening of the case, the gasket sealing the opening,
wherein the center pin and the terminal are integrally formed with each other.

2. The rechargeable battery of claim 1, wherein the uncoated region of the first electrode extends along a length direction of the electrode assembly and contacts the center pin along a length of the center pin.

3. The rechargeable battery of claim 1, wherein the uncoated region of the first electrode is connected to the center pin by welding.

4. The rechargeable battery of claim 1, wherein the uncoated region of the second electrode extends along a length of the electrode assembly at an outermost end of the electrode assembly.

5. The rechargeable battery of claim 4, wherein the uncoated region of the second electrode directly contacts an inner surface of the case.

6. The rechargeable battery of claim 4, wherein the uncoated region of the second electrode comprises an extended portion, the extended portion having a length that is greater than a distance between a bottom of the case and an inner surface of the gasket, and
wherein the extended portion is bent at an outermost end of the electrode assembly and contacts an inner surface of the case.

7. The rechargeable battery of claim 4, wherein the second electrode comprises aluminum, and
wherein the case comprises stainless steel.

8. The rechargeable battery of claim 1, wherein a diameter of the terminal is greater than a diameter of the center pin.

9. The rechargeable battery of claim 8, wherein the case comprises a beading portion that is recessed toward a center of the diameter near a boundary of the center pin and the terminal.

10. The rechargeable battery of claim 1, wherein the uncoated region of the first electrode is adjacent to the gasket along a length of the electrode assembly.

11. The rechargeable battery of claim 10, wherein the uncoated region of the first electrode comprises a first extended portion which extends from a center of a diameter of the electrode assembly, and
wherein the first extended portion is welded to the center pin.

12. The rechargeable battery of claim 10, wherein the uncoated region of the second electrode is at a bottom of the case along the length of the electrode assembly.

13. The rechargeable battery of claim 12, wherein the uncoated region of the second electrode comprises a second extended portion which extends from an outermost end of a diameter of the electrode assembly, and
wherein the second extended portion is bent at an outermost end along a circumference of the electrode assembly.

14. The rechargeable battery of claim 1, wherein the case has a diameter of about 2 mm to about 5 mm.

* * * * *